J. BLUE.
PLANTER.
APPLICATION FILED SEPT. 19, 1919.
1,412,913. Patented Apr. 18, 1922.
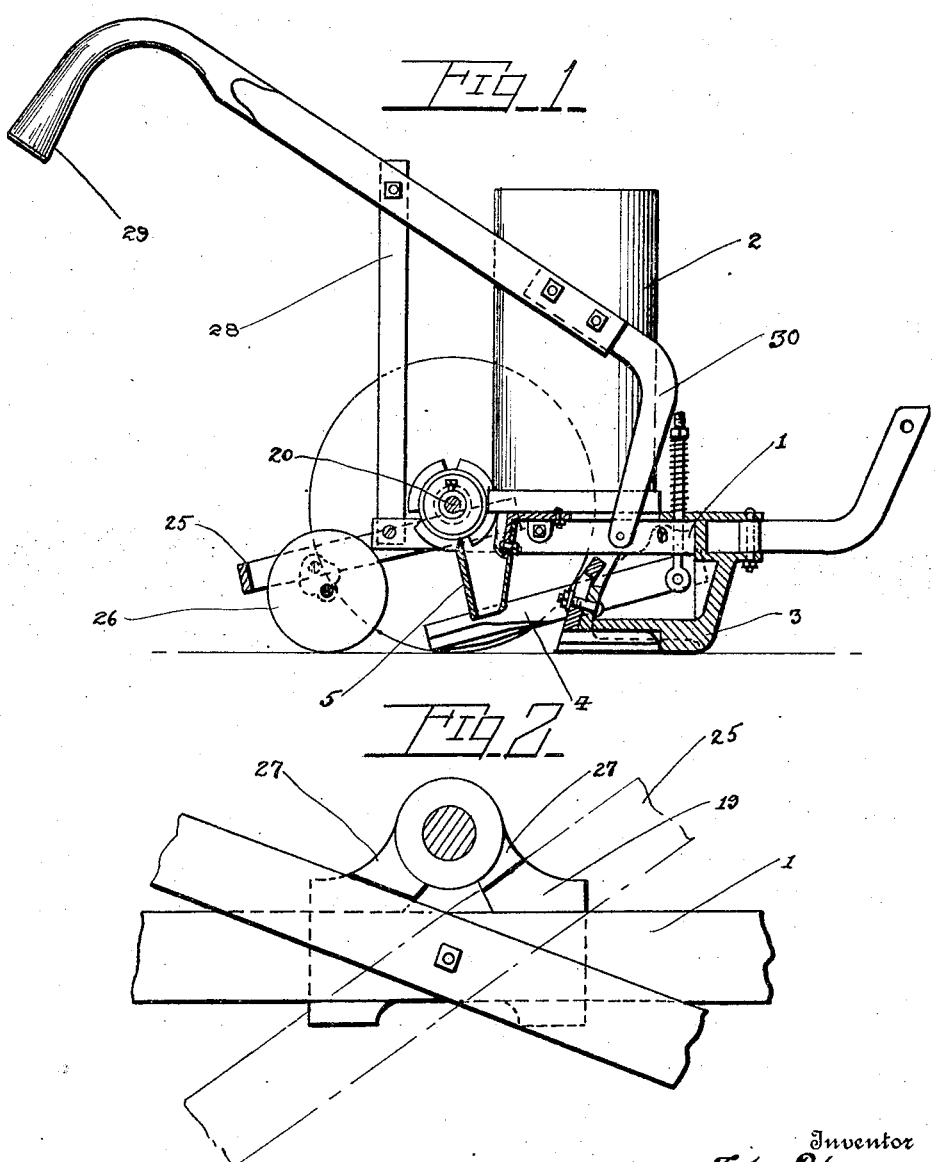

UNITED STATES PATENT OFFICE.

JOHN BLUE, OF LAURINBURG, NORTH CAROLINA.

PLANTER.

1,412,913.  Specification of Letters Patent.  Patented Apr. 18, 1922.

Original application filed October 11, 1918, Serial No. 257,724. Divided and this application filed September 19, 1919. Serial No. 324,919.

*To all whom it may concern:*

Be it known that I, JOHN BLUE, a citizen of the United States, residing at Laurinburg, in the county of Scotland and State of North Carolina, have invented a new and useful Planter, of which the following is a specification.

This invention relates to planters and is more especially a division of an application filed by me on Oct. 11th, 1918, Serial Number 257,724.

One of the objects of the invention is to provide a smoothing roller in connection with the planter structure and which is so mounted as to have a limited upward and downward swinging movement relative to the said structure, said roller having novel means for limiting its swinging movement and being readily placed in position on the planter.

With the foregoing and other objects in view, which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention.

In the accompanying drawings the preferred form of the invention has been shown.

In said drawings—

Figure 1 is a section through a portion of a planter having the present improvements applied thereto.

Figure 2 is a detail view of a portion of the device and showing the means for limiting the movement of the yoke of the smoothing roller.

Referring to the figures by characters of reference 1 designates a frame on which is mounted a seed hopper 2 and under this frame is arranged a furrow opening shoe 3 and covering blades 4. The outlet spout 5 is adapted to discharge seeds into the furrow where they will be covered by soil scraped into the furrow by the blades 4. This structure, in itself constitutes no part of the present invention but has been set forth in my copending application herein referred to.

Bearing plates 19 are bolted to the side of the main frame above the rear portions of the covering blades 4 and support a shaft 20 extending transversely of the machine.

Pivotally connected to the bearing plates 19 are the forward ends of the sides of a bail or yoke 25 in which is journaled a smoothing roller 26. Lugs 27 are formed on the plates 19 and serve to limit the swinging movement of the yoke relative to the sides of the frame 1.

Bars 28 having handles 29 at their upper ends are connected at their lower ends to the sides of frame 1 and a brace 30 connects the bars 28 to the frame also.

By pushing the handles 29 downwardly the frame of the planter will be swung relative to the yoke 25 until the lugs 27 come against said yoke whereupon the entire planter will swing upwardly upon the roller 26 and can be rolled readily from place to place. By lifting the handles 29 the roller 26 can be raised out of contact with the ground.

What is claimed is:—

In a planter the combination with a wheel supported axle, of a frame extending under the axle, bearing plates secured to the sides of the frame and engaging the axle, a yoke pivotally connected to the frame below the axle, a smoothing roller carried by the yoke, and lugs upon the bearing plates and overhanging the yoke, said lugs and yoke cooperating to limit the relative movement of the frame and yoke in either direction when tilted.

In testimony that I claim the foregoing as my own, I have hereto affixed my signature in the presence of two witnesses.

JOHN BLUE.

Witnesses:
C. L. MCCOY,
M. BINERLAY.